US006873901B2

(12) United States Patent
Christner et al.

(10) Patent No.: US 6,873,901 B2
(45) Date of Patent: Mar. 29, 2005

(54) METHOD FOR OPERATING AN ELECTRONIC CONTROLLER OF A MOTOR VEHICLE

(75) Inventors: Bernd Christner, Huelben (DE); Frank Duvinage, Kirchheim (DE); Arno Nolte, Stuttgart (DE); Markus Paule, Korb (DE); Henning Sander, Ludwigsburg (DE)

(73) Assignee: DaimlerChrysler AG, Stuttgart (DE)

( * ) Notice: Subject to any disclaimer, the term of this patent is extended or adjusted under 35 U.S.C. 154(b) by 73 days.

(21) Appl. No.: 10/307,511

(22) Filed: Dec. 2, 2002

(65) Prior Publication Data

US 2003/0196647 A1 Oct. 23, 2003

(30) Foreign Application Priority Data

Dec. 1, 2001 (DE) .......................................... 101 59 069

(51) Int. Cl.[7] ............................................. F02D 41/02
(52) U.S. Cl. ........................ 701/108; 123/672; 60/274
(58) Field of Search .............................. 701/108, 102; 123/672, 674, 568.21, 568.22; 60/274, 276

(56) References Cited

U.S. PATENT DOCUMENTS

| 5,442,918 A | * | 8/1995 | Baeuerle et al. ............... 60/602 |
| 6,009,862 A | * | 1/2000 | Wanat et al. ........... 123/568.22 |
| 6,688,164 B2 | * | 2/2004 | Landschoff ................ 73/117.3 |

FOREIGN PATENT DOCUMENTS

| JP | 2003269236 A | * | 9/2003 | ........... F02D/45/00 |
| WO | WO 03/033896 A | * | 4/2003 | ........... F02D/45/00 |

* cited by examiner

Primary Examiner—Hieu T. Vo
(74) Attorney, Agent, or Firm—Crowell & Moring LLP

(57) ABSTRACT

A method for operating an electronic controller of a motor vehicle, in particular of an engine controller, with which signal processing is carried out in order to control the operation of the motor vehicle and/or of the engine. The signal processing of the controller includes a filtering operation, the filtering operation being carried out as a function of the operating state of the motor vehicle and/or of the engine.

12 Claims, 1 Drawing Sheet

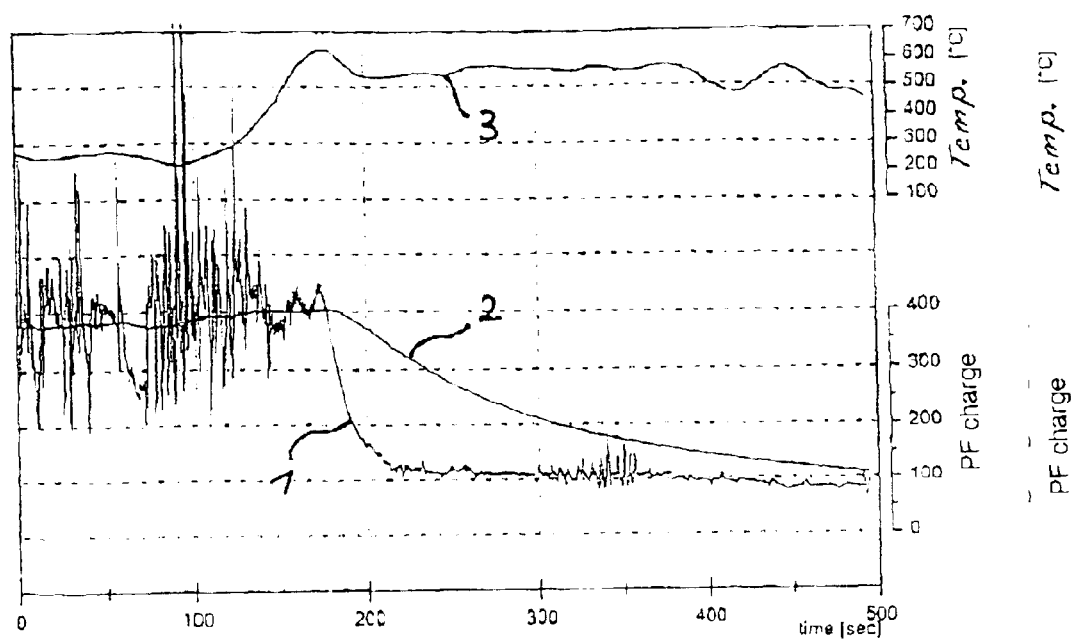

METHOD FOR OPERATING AN ELECTRONIC CONTROLLER OF A MOTOR VEHICLE

BACKGROUND AND SUMMARY OF THE INVENTION

This application claims the priority of German Application No. 101 59 069.5, filed Dec. 1, 2001, the disclosure of which is expressly incorporated by reference herein.

The present invention relates to a method for operating an electronic controller of a motor vehicle.

The operation of modern motor vehicles or of engines for driving them is usually controlled by an electronic controller. For this purpose, the controller is provided with a plurality of input signals which are usually supplied by associated sensors. These signals are further processed in the controller. Output signals which influence the operation of the motor vehicle and/or of the associated engine are generated as a function of the result of this signal processing. Typical output signals are control signals which relate to the driving state of the motor vehicle or the fuel injection. These output signals influence, for example, the rotational speed or the output power of the engine. For the reliability and the quality of the operation of the motor vehicle or of the engine it is important for the controller to be operated with reliable and precise signal processing.

The object of the present invention is to provide a method for improved operation of an electronic controller of a motor vehicle and/or of a motor vehicle engine.

According to the invention, the signal processing of the controller includes a filtering operation, carried out as a function of the operating state of the motor vehicle and/or of the engine. According to the invention, the decision as to whether or not filtering is to be carried out for a specific signal is taken as a function of the operating state of the motor vehicle and/or of the engine. If, for example, it is known, or there is a risk, that an operating parameter of the engine, for example the rotational speed of the engine, has a disruptive influence on a signal, for example the signal of a sensor, within a specific value range, it is thus possible to provide a signal. The filtering operation for this signal, which filtering operation is activated if the respective engine operating parameter is in this specified value range. Because the filtering operation may be associated with a loss of information or a loss of sensitivity, it is advantageous to dispense with the filtering of the signals when the respective parameter leaves the critical value range, and thus when the disruptive influence is eliminated. Therefore the unfiltered signal is again processed. It is particularly advantageous to influence the type of filtering or the characteristic values which characterize the filtering, in the controller. This influence advantageously enables the signal processing to be adapted to the dynamics of the respective operating states. In this way, for example variables which characterize the operation of an internal combustion engine, such as the rotational speed, fuel injection conditions, torque or partial vacuum of the intake manifold in the idling mode, change comparatively slowly while they change comparatively quickly during the acceleration processes of the respective motor vehicle. Variables which determine the operating state of the entire motor vehicle change in a comparable way. Depending on the operating state of the motor vehicle, these variables, for example the travel speed, the pressure of the fuel in the supply system or the like, may change more or less quickly. By means of a filtering operation, adapted to the operating state, during the signal processing it is possible to control the operation of the motor vehicle and/or of the engine in an optimum way at any time. For this purpose, the filtering operation is carried out at an expediently selected point on the signal path. For example, the filtering operation can be carried out directly on the input signal which is received in the controller, or after a logic operation has been performed on a plurality of signals. Here, according to the invention, a filtering operation is understood in a general way as the selective influencing of the amplitude spectrum of a signal. Depending on the type of signal, the filtering may achieve various advantages or objectives. For example, the removal, gating out or reduction of interference or extraneous frequency components of the signal, such as noise, interference peaks or the like, may be aimed at, or, in the case of an output signal of the engine controller, the dynamics of the signal can be adapted to the inertia of the component actuated with it.

In a refinement of the invention, the filtering operation includes a low-pass filtering operation. By means of a low-pass filtering operation it is possible, in particular, to smooth a signal or to remove undesired interference peaks, as a result of which a more reliable and precise control of the operation of the motor vehicle or of the engine is made possible. Relatively large frequency components of a signal are preferably then removed or attenuated by means of the low-pass filtering if procedures, which may vary slowly, are sensed or controlled by means of the signal on the basis of the current operating state of the motor vehicle or of the engine. If the respective process becomes variable more quickly as a result of a change of the operating state, it is then possible to react by, for example, reducing the attenuation or other characteristic values of the low-pass filtering operation, so that the variables which change quickly over their time profile can then be reliably registered.

In a further refinement of the invention, a cut-off frequency and/or attenuation operation which is assigned to the low-pass filtering operation are selected as a function of the operating state of the internal combustion engine. Cut-off frequency is to be understood as the frequency above which attenuation ideally becomes effective or changes in accordance with the filter characteristic. If, for example in the case of a low-pass filtering operation, a first-order delay element is used for smoothing a signal, depending on the dynamics of the current motor vehicle operation or engine operation the cut-off frequency can be increased or decreased, and the frequency range in which the signal smoothing takes place can be adapted to the current conditions. In a similar manner, by switching over to a different type of signal filtering it is possible to increase or reduce the degree of attenuation in a specific frequency range, as required and as a function of the operating state of the motor vehicle or engine.

In a further refinement of the invention, the filtering operation is carried out when determining and/or processing a characteristic variable which is assigned to an exhaust gas purification device of the motor vehicle. The optimum operational capability of exhaust gas purification devices have a particular significance due to the tightening of limiting values for pollutants. Exhaust gas purification devices of motor vehicles with internal combustion engines frequently have fragile, fault-prone or sensitive sensors whose signals have to be conditioned and processed in compliance with the situation as satisfactorily as possible so that the required quality of the exhaust gas purification is obtained. Some examples include frequency and amplitude control and the regulation of the air/fuel ratio in spark ignition engines, which are equipped with three-way catalytic converters. In this case, lambda probes are used in the exhaust gas purification system to sense the air/fuel ratio of the exhaust gas, and the combustion is controlled or regulated by the engine controller. The reliability during signal processing, in particular of weak or fault-prone signals, is of great importance for the best possible purification of the exhaust gases here. A further example is the operation of nitrogen oxide storage-type catalytic converters which have to be regenerated from time to time by changing from lean combustion to rich combustion. For this process to be controlled in an optimum way it is necessary to perform satisfactory signal conditioning which is advantageously achieved by filtering as a function of the operating state during the signal processing of the engine controller.

In a further refinement of the invention, the filtering operation is carried out when determining and/or processing a variable assigned to a charge of a particle filter arranged in an exhaust gas purification device of an engine which is embodied in particular as an autoignition internal combustion engine. Motor vehicle engines which are embodied in particular as autoignition internal combustion engines or as diesel engines can be equipped with a particle filter in the exhaust gas purification device in order to reduce the emission of particles. As a result of the accumulation of particles, the particle charge of these filters increases over the course of time so that these filters are regenerated at recurring intervals, preferably by burning off the collected particles of soot. The charge is typically continuously determined on the basis of a measurement of pressure or of a measurement of pressure differences. Here, the signal which is supplied by a pressure sensor is transmitted to the controller and the current charge of the particle filter is usually determined by logic linking to other calculated signals, or signals determined in some other way, such as exhaust gas temperature, air throughput rate, fuel throughput rate, rotational speed and the like. The signal filtering operation according to the invention when determining the charge of the particle filter as a function of the operating state of the internal combustion engine improves the precision of the determined charge value in a particularly advantageous way. On the one hand the slowly varying process of the increasing particle filter charge can be reliably tracked and on the other hand, the charge value which changes relatively quickly during the regeneration of the particle filter, can be determined more precisely. This improves the detection of the need for particle filter regeneration, and the monitoring of the regeneration process, and thus improves the operation of the internal combustion engine overall.

In a further refinement of the method according to the invention, in an operating state of the motor vehicle and/or of the internal combustion engine which is assigned to an active regeneration of the particle filter, the filtering operation is carried out when determining and/or processing the particle filter charge variable with a higher cut-off frequency and/or smaller attenuation than in an operating state of the motor vehicle and/or of the internal combustion engine which is assigned to a charge of the particle filter. This measure improves the reliability of the evaluation of the pressure signal for the determination of the particle filter charge during the regeneration of the particle filter during which the charge of the particle filter decreases rapidly. When the particle filter regeneration and the associated operating state of the internal combustion engine are terminated, a slowly changing charge of the particle filter occurs again and the abovementioned measure is reversed, i.e. the cut-off frequency of the signal filtering operation is reduced again and/or the attenuation is increased again in operating states in which the particle filter is charged. In this way, the variable which is assigned to the charging of the particle filter is smoothed again to a greater extent, which ensures its reliable interpretation.

Other objects, advantages and novel features of the present invention will become apparent from the following detailed description of the invention when considered in conjunction with the accompanying drawings.

The invention will be explained in more detail below with reference to a drawing and an associated example.

BRIEF DESCRIPTION OF THE DRAWINGS

The single FIGURE is a schematic diagram showing the time profile of different variables or signals during the charging and the regeneration of a particle filter.

DETAILED DESCRIPTION OF THE PREFERRED EMBODIMENTS

In the diagram in the FIGURE, the time profile of the charging of the particle filter such as is obtained after filtering with low attenuation is carried out is illustrated as curve 1. Curve 2 shows the profile of the same variable, but after filtering by means of a filter with high attenuation. Curve 3 shows the parallel profile of the temperature of the associated particle filter. The relationship of the respective scaling is shown on the right-hand edge of the diagram, in standardized, dimensionless units for the particle-filter charge variable. The determination of the charge of the particle filter is carried out in the engine controller on the basis of sensor signal values which are also fed to the engine controller. The essential variables are the measured values of a difference pressure sensor which senses the differential pressure built up in the course of the flow resistance of the particle filter, and further sensor signals for the rotational speed and the air and fuel throughput rate. The precise method of calculation is not of primary interest here, for which reason details have not been represented.

In the region which is chronologically before the abscissa value of 150 sec, charging of the particle filter was continuously increased by the particles of the exhaust gas of a diesel engine during normal mixed driving operation of the respective motor vehicle for approximately 10 hours. At approximately 150 sec, active regeneration of the charged particle filter is initiated. This includes mainly increasing the temperature of the exhaust gas by means of various measures, for example late post-injection of fuel. As a result, the particle filter temperature rises in accordance with curve 3. At an abscissa value of approximately 170 sec, the regeneration of the particle filter starts (particle filter temperature approximately 600° C.) as a result of the burning off of accumulated soot particles, and the charge value which is determined drops quickly again in accordance with curve 1.

In the course of curve 1, the calculated value for the charging of the particle filter is subjected to a filtering operation of a first-order delay element (VZ1 element) which has a cut-off frequency of approximately 10 Hz. According to corresponding investigations, the reversal of the charging of the particle filter during the regeneration in the time range between 150 sec and 250 see is represented correctly and reliably by curve 1. With this type of operation of the internal combustion engine with relatively quickly changing charging of the particle filter, the performed attenuation of the charge value proves satisfactory. In the time range before 150 sec, during the charging of the particle filter, the calculated value for the charging of the particle filter according to curve 1 is, however, clearly unsteady and subjected to severe fluctuations. Unrealistic, steep peaks occur in the value for the charging of the particle filter. The attenuation of the particle filter charge is insufficient. The initiation of particle filter regeneration on the basis of a single occasion when a fixed charge threshold value is exceeded would lead to premature triggering of the particle filter regeneration and undesirably disrupt the operation of the internal combustion engine.

The conditions during the charging of the particle filter are represented significantly better if the calculated value is subjected to a filtering operation with a VZ1 element which has a cut-off frequency of significantly less than 1 Hz. Signal components with a higher frequency are subjected to correspondingly greater attenuation. The profile of the particle filter charge which is obtained here is represented by curve 2. Here, a plausible and correct, slowly rising and steady profile for the charging of the particle filter is obtained. However, after the active particle filter regeneration starts, the highly attenuated value, which is represented by curve 2, for the particle filter charge, drops only very slowly. Due to the very low cut-off frequency during filtering, the calculated value for the particle filter charge in this operating state of the internal combustion engine is represented incorrectly. The actual change in the particle filter charge takes place in a shorter time period than corresponds to the time constant of the VZ1 element. The signal which is filtered in this way for the particle filter charge can therefore not follow the rapid actual change. Therefore, its value is represented in a falsified way. Ending the filter regeneration on the basis of a particle filter charge, which is determined in such a way, therefore results in an unnecessary and undesired prolongation of the regeneration process, and thus also disrupts the operation of the internal combustion engine.

In order to sense the actual conditions in a certain and reliable way, the controller is operated according to the invention so that the calculated particle filter charge is filtered as a function of the operating state of the motor vehicle or of the internal combustion engine. A sensor signal, which is representative of the operating state of the motor vehicle or of the internal combustion engine, is expediently used. In order to detect the operating state of the internal combustion engine, this signal can be, for example, the signal of an engine speed sensor, the signal of a sensor for the load of the internal combustion engine, the partial vacuum of the intake manifold, the engine torque or the fuel injection pressure. Further examples are sensors for acceleration and deceleration or wheel speed sensors. For example the travel speed, the coolant temperature or a temperature of the exhaust gas purification device can be used to detect the operating state of the motor vehicle. If the internal combustion engine is in a normal travel mode in which continuous charging of the particle filter takes place, the signal, which is assigned to the particle filter charge, is subjected to a high degree of attenuation. For this purpose, a VZ1 element which has a very low cut-off frequency of, for example, 0.1 Hz is preferably used as the electrical signal filter. Starting from this cut-off frequency, signal components with a relatively high frequency are subject to attenuation of 20 dB per octave. Signal components with a relatively high frequency, which can occur in particular as a result of the addition of random fluctuations, are thus suppressed, and the profile of the particle filter charge value is smoothed. Of course, the controller can also be operated in such a way that it is not the value of the particle filter charge which is filtered after its calculation but rather the underlying input signals which are filtered. Furthermore, it is to be assumed that the low-pass filtering can also be carried out by means of a higher-order delay element (VZn element with n>1). The corresponding cut-off frequencies can thus be suitably selected. Similarly, instead of VZn elements it is also possible to use other attenuator elements, low-pass filters or filters such as Bessel or Butterworth filters.

When the value for the particle filter charge reaches a predefined limit, the operation of the internal combustion engine is switched over to initiate or carry out the regeneration of the particle filter. At the same time, according to the invention the attenuation of the calculated signal for the particle filter charge is reduced. This is preferably carried out by increasing the cut-off frequency of the VZ1 element to, for example, 10 Hz. When the regeneration of the particle filter is concluded, which is the case, for example, after a predetermined time period has elapsed or after a predetermined minimum value for the particle filter charge has been reached, it is possible to switch over again to a normal operating mode of the internal combustion engine and to a higher level of signal attenuation.

As a result of filtering of the particle charge signal which is carried out as a function of the operation of the internal combustion engine, the actual conditions are, as described, represented reliably and correctly. As a result, the operation of the internal combustion engine takes place in a particularly reliable way overall.

The carrying out of filtering according to the present invention as a function of the operation of a motor vehicle and/or engine during the processing of signals by an electronic controller is, of course, not restricted to the signals mentioned here by way of example in the context of the determination of the charge of a particle filter. Instead, the method can also be applied to other variables, preferably if they have dynamics which are heavily dependent on the operation of the internal combustion engine. For example, variables which are significant in the context of the fuel injection, the setting of ignition times, the control of the combustion, the exhaust gas feedback or generally in the context of the operation of the engine, are possible. The influencing of the signal filtering operation as a function of the respective operating state of the motor vehicle and/or of the engine can take place continuously or incrementally. It is particularly advantageous in this context, as mentioned, to carry out low-pass filtering. However, other types of signal filtering operation may also be advantageous. An example of this mentioned here is the use of a bandpass filter as a function of the operating state with the bandpass filter being used for filtering out, when necessary, for example humming or rumbling disruptions of signals which occur in certain operating states of the motor vehicle and/or of the engine. Depending on whether the electronic controller is processing analog or digital signals, it is possible to use appropriately suitable analog or digital signal filters for the signal filtering operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A signal processing method for operating an electronic controller of a motor vehicle, in order to control the operation of the motor vehicle, said method comprising the steps of:

determining an operating state of the motor as a function of at least one parameter wherein said at least one parameter modifies a variable signal; and providing a filtering operation of said signal carried out as a function of the operating state of the motor vehicle.

2. The method according to claim 1, wherein the filtering operation is a low-pass filtering operation.

3. The method according to claim 1, further comprising the step of:
selecting at least one of a cut-off frequency which is assigned to the filtering operation and an assigned attenuating operation as a function of the operating state of the motor vehicle.

4. The method according to claim 1, wherein the filtering operation is carried out when at least one of determining and processing a characteristic variable which is assigned to an exhaust gas purification device of the motor vehicle.

5. The method according to claim 1, wherein the filtering operation is carried out when at least one of determining and processing a variable which is assigned to a charge of a particle filter which is arranged in an exhaust gas purification device of a motor vehicle autoignition internal combustion engine.

6. The method according to claim 5, wherein, in an operating state of at least one of the motor vehicle and of the internal combustion engine which is assigned to an active regeneration of the particle filter, the filtering operation is carried out when at least one of determining and processing the particle filter charge variable with at least one of a higher cut-off frequency and smaller attenuation than in an operating state of at least one of the motor vehicle and the internal combustion engine which is assigned to a charge of the particle filter.

7. A method for operating an electronic engine controller, comprising the steps of:
determining an operating state of an engine as a function of at least one parameter which parameter modifies a variable signal; and
providing a filtering operation as a function of said operating state of said engine.

8. The method according to claim 7, wherein the filtering operation is a low-pass filtering operation.

9. The method according to claim 7, further comprising the steps of:
selecting at least one of a cut-off frequency which is assigned to the filtering operation and an assigned attenuating operation as a function of the operating state of the engine.

10. The method according to claim 7, wherein the filtering operation is carried out when at least one of determining and processing a characteristic variable which is assigned to an exhaust gas purification device of the engine.

11. A signal processing method for operating an electronic controller of a motor vehicle, in order to control the operation of the motor vehicle, said method comprising the steps of:
determining an operation state of the motor vehicle; and
providing a filtering operation carried out as a function of the operating state of the motor vehicle;
wherein the filtering operation is carried out when at least one of determining and processing a variable which is assigned to a charge of a particle filter which is arranged in an exhaust gas purification device of a motor vehicle autoignition internal combustion engine.

12. The method according to claim 11, wherein, in an operating state of at least one of the motor vehicle and of the internal combustion engine which is assigned to an active regeneration of the particle filter, the filtering operation is carried out when at least one of determining and processing the particle filter charge variable with at least one of a higher cut-off frequency and a smaller attenuation than in an operating state of at least one of the motor vehicle and the internal combustion engine which is assigned to a charge of the particle filter.

* * * * *